USB008693132B1

(12) United States Patent
Koay et al.

(10) Patent No.: US 8,693,132 B1
(45) Date of Patent: Apr. 8, 2014

(54) ACTUATOR ARM UNLATCHING

(71) Applicant: Seagate Technology LLC, Cupertino, CA (US)

(72) Inventors: KarWei Koay, Erie, CO (US); LingZhi Yang, Longmont, CO (US); SangHoon Lee, Longmont, CO (US)

(73) Assignee: Seagate Technology, LLC, Cupertino, CA (US)

( * ) Notice: Subject to any disclaimer, the term of this patent is extended or adjusted under 35 U.S.C. 154(b) by 0 days.

(21) Appl. No.: 13/658,344

(22) Filed: Oct. 23, 2012

Related U.S. Application Data

(60) Provisional application No. 61/714,741, filed on Oct. 16, 2012.

(51) Int. Cl.
*G11B 21/12* (2006.01)

(52) U.S. Cl.
USPC ............................................................ 360/75

(58) Field of Classification Search
None
See application file for complete search history.

(56) References Cited

U.S. PATENT DOCUMENTS

| | | | |
|---|---|---|---|
| 6,154,340 A | 11/2000 | Cameron | |
| 6,212,027 B1 * | 4/2001 | Lee et al. | 360/78.14 |
| 6,229,663 B1 * | 5/2001 | Yoneda et al. | 360/75 |
| 6,252,364 B1 * | 6/2001 | Chiang et al. | 318/280 |
| 6,496,324 B1 | 12/2002 | Golowka et al. | |
| 6,617,011 B2 | 9/2003 | Wu et al. | |
| 6,660,886 B1 | 12/2003 | Liu et al. | |
| 6,661,598 B2 * | 12/2003 | Kusumoto et al. | 360/75 |
| 6,867,944 B1 * | 3/2005 | Ryan | 360/75 |
| 6,922,302 B2 * | 7/2005 | Kusumoto et al. | 360/75 |
| 6,937,427 B2 | 8/2005 | Tan et al. | |
| 7,068,463 B1 | 6/2006 | Ji et al. | |
| 7,145,743 B2 * | 12/2006 | Park et al. | 360/75 |
| 7,190,542 B2 * | 3/2007 | Yeo et al. | 360/75 |
| 7,193,804 B1 | 3/2007 | Kheymehdooz | |
| 7,660,067 B1 * | 2/2010 | Ji et al. | 360/75 |
| 7,787,211 B2 | 8/2010 | Kim et al. | |
| 7,800,857 B1 | 9/2010 | Calaway et al. | |
| 7,876,522 B1 | 1/2011 | Calaway et al. | |
| 8,072,703 B1 | 12/2011 | Calaway et al. | |
| 2007/0291394 A1 | 12/2007 | Hara et al. | |
| 2010/0182715 A1 | 7/2010 | Harmer | |

FOREIGN PATENT DOCUMENTS

WO 9707507 A1 2/1997

* cited by examiner

*Primary Examiner* — Wayne Young
*Assistant Examiner* — James L Habermehl
(74) *Attorney, Agent, or Firm* — Cesari & Reed, LLP; Kirk A. Cesari; David K. Lucente

(57) ABSTRACT

Apparatuses and methods are disclosed that relate to movement of actuator arms from a stopped position. In one example, a method may include attempting to unlatch an actuator arm from a stop and measuring an electrical parameter of a driver circuit of the actuator arm. The method may further include detecting an unsafe unlatch event using a controller when the electrical parameter does not exceed a first threshold within a predetermined period of time.

19 Claims, 5 Drawing Sheets

ACTUATOR ARM UNLATCHING

CROSS REFERENCE TO RELATED APPLICATIONS

The present application claims priority to U.S. provisional patent application Ser. No. 61/714,741, filed Oct. 16, 2012, entitled "Actuator Arm Unlatching", the contents of which is hereby incorporated by reference in its entirety.

BACKGROUND

The present disclosure is generally related to movement of actuator arms, including systems, apparatuses, and methods of moving a load, such as an actuator arm, from a stopped position.

SUMMARY

The present disclosure is generally related to movement of actuator arms from a stopped position, which may be referred to as unlatching. In one example, a method can include attempting to unlatch an actuator arm from a stop, measuring an electrical parameter of a driver circuit of the actuator arm, and detecting an unsafe unlatch event using a controller when the electrical parameter does not exceed a first threshold within a predetermined period of time.

In another example, an apparatus may include an actuator arm that is configured to park at a stop area, a controller coupled to a motor configured to drive the actuator arm, the controller configured to: determine an electrical parameter of the motor; apply a current to the motor to attempt to unlatch the actuator arm from the stop area; and detect an error event when the electrical parameter is less than a first threshold after a period of time.

In yet another example, an apparatus can include a controller coupled to a motor and configured to control the motor to attempt to move a movable element, the controller further configured to: detect a safe event when an electrical parameter of the motor exceeds a first threshold within a predetermined period; and detect an unsafe event when the electrical parameter does not exceed the first threshold within the predetermined period.

DETAILED DESCRIPTION

Figure 1:
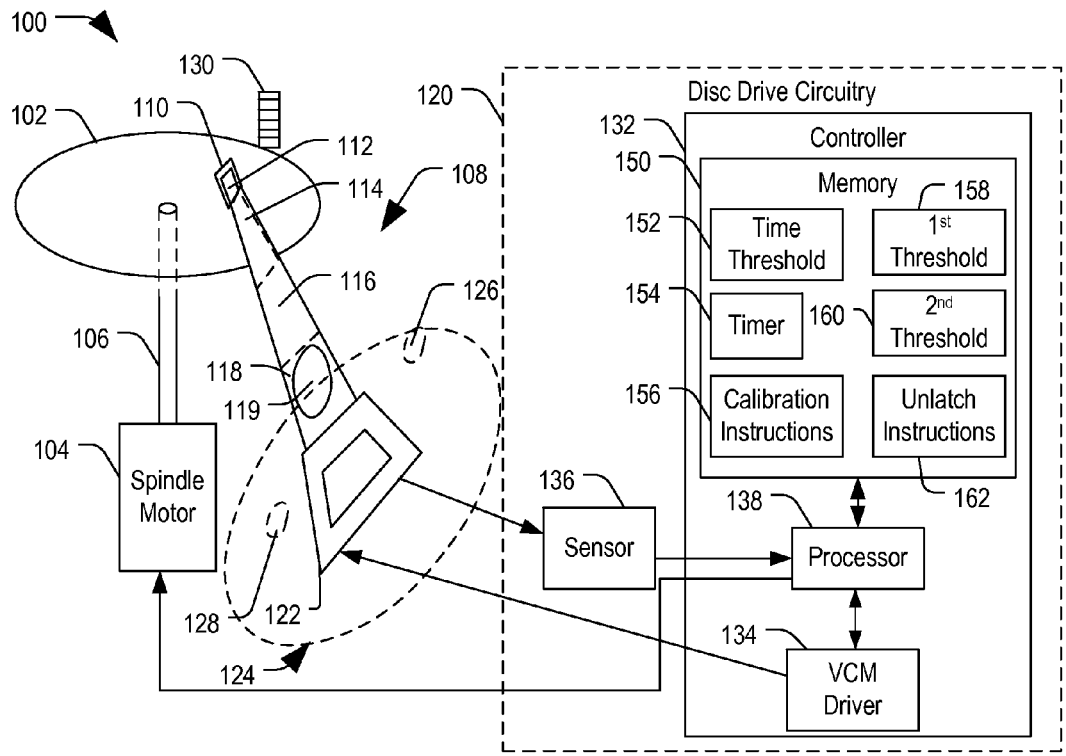
FIG. 1 is a diagram of an illustrative embodiment of an apparatus configured to implement actuator arm unlatching.

In the following detailed description of the embodiments, reference is made to the accompanying drawings which form a part hereof, and in which are shown by way of illustration of specific embodiments. It is to be understood that other embodiments may be utilized and changes may be made without departing from the scope of the present disclosure.

A data storage device, and in particular, a disc drive that reads and writes information on a disc-shaped data storage medium, may use a rotary arm actuator mechanism or a linear actuator mechanism for positioning a read/write head over successive data tracks on the discs. When the data storage device is not in use, the rotary arm or linear actuator can be moved to a retracted or parked position in which the rotary arm or linear actuator are moved away from the surface of the disc-shaped data storage medium to a stop area. To resume use of the data storage medium, the read/write heads can be repositioned over the surface of the data storage medium in a controlled manner.

Moving an actuator to a stop area may include parking the read/write head(s) at a crash stop, which may be made from a rubber material to cushion the impact of the actuator arm during the parking operation. The rubber material sometimes sticks to the actuator arm, making it difficult to unlatch the actuator arm. The actuator arm may be parked against the crash stop for extended periods of time and at varying ambient conditions (i.e., different temperatures and different levels of humidity), which may allow an adhesive bond to develop between the crash stop and the actuator arm. The strength or adhesion of the bond may increase over extended periods of time when the actuator arm is not in use.

When unlatching an actuator arm from a parked state, it is desirable to be able to apply a high torque for a long period in order to break any bonds of adhesion that have formed between the surfaces of the crash stop and the actuator arm. To apply such torque, a system may drive current through a motor that controls the position of an actuator and may also control the speed of the unlatch action so that the actuator and read/write heads transition out of parking into normal operation, safely and reliably. In some examples, a disc drive can support a head loading velocity control mechanism that measures the back electromotive force (BEMF) voltage across the actuator (for example a voice coil motor (VCM) actuator) to obtain an indication of the velocity of the actuator, which velocity can be employed in a control scheme during the loading operation. VCM coil resistance can change with increased temperature, which can increase due to application of current during the unlatch operation.

To unpark from a stop area (e.g. a sticky stop area) or crash stop, current may be applied to the actuator for an extended period of time, which can cause the VCM coil resistance to increase and introduce measurement errors into the BEMF voltage measurement. After attempting to move the actuator for an extended period, the actuator arm can fail to unlatch from the crash stop or, if it unlatches, there can be an excessive BEMF measurement error that can make it unsafe to transition to normal operation.

In particular, embodiments provide for unlatching a load (e.g. an actuator arm) from a stop area, such as a sticky stop area where adhesion between the load and the stop area cause a high magnitude and long duration of applied force or torque to be applied. The magnitude and duration of such can provide large errors in measurements of associated electrical parameters, such as the BEMF voltage. In an example, a controller can control a motor to attempt to move a load and can monitor an electrical parameter associated with at least one of the motor and the load. If the electrical parameter exceeds a first threshold within a first period of time, the controller may detects a safe move (or unlatch) event. In a safe unlatch event, the attempt to move the load succeeds before a measurement error becomes too large for transitioning directly to normal operation.

If the electrical parameter does not exceed the first threshold within the first period of time, the controller may detect an unsafe event, such as an unsafe movement event, an unsafe unlatch event, or non-movement. In response to detecting an unsafe event, the controller can continue to attempt to move the load until the electrical parameter exceeds a second threshold. When the second threshold is exceeded, the controller can park the load at the stop area, recalibrate a sensor for measuring the electrical parameter, and again attempt to move the load. The process of attempting to move the load, parking the load, and recalibrating the sensor is repeated iteratively until the controller achieves a safe unlatch event or a movement attempt count threshold is reached. In some embodiments, after multiple attempts to move, if the actuator arm is not moving, the controller may abort the attempt.

While a process for moving a load from a stop area is described below in connection with a disc drive employing a crash stop against which an actuator arm rests during idle periods, embodiments described below may also be employed in data storage devices that use other actuator arm loading/unloading mechanisms, as well as with other types of control systems that control a motor to move a load from a stop area or stopped state, such as a motor to move a robotic arm or other structure. An example of one possible embodiment of a data storage device including a controller configured to move an actuator arm from a stop area, such as an inside or outside diameter crash stop of a disc drive, is described below with respect FIG. 1.

FIG. 1 is a diagram of a portion of a disc drive system 100 including a controller 132 configured to unlatch an actuator 118 from a stop area. Disc drive system 100 can include disc drive circuitry 120 coupled to an actuator or motor that may be configured to move an actuator arm 116 relative to a disc 102. The disc 102 can be mounted to spindle 106, which may be coupled to a spindle motor 104 configured to turn spindle 106 to rotate the disc 102. The disc drive system 100 may include a load/unload ramp block 130 at an outside edge of the disc 102, which a read/write transducer 112 at the end of actuator arm 116 and suspension 114 may rest when the actuator is parked. A lift tab may extend from the end of suspension 114 to engage with a ramp of load/unload ramp block 130 when parked to facilitate securing of the read/write transducer 112 at a parked position.

The actuator 118 may be a rotary moving coil actuator that includes a voice coil motor (VCM), generally indicated at 124. VCM 124 can rotate the actuator 118 with its attached read/write head 112 about a pivot shaft 119 to position read/write head 112 over a desired data track and can move along an arcuate path between an inner disc diameter (ID) of the disc 102 and an outer disc diameter (OD). An ID crash stop 126 and an OD crash stop 128 can be included to limit movement of actuator 118. VCM 124 may be driven by disc drive circuitry 120 based on signals generated by heads, such as read/write head 112, and by a host computing system (not shown). Signals generated by read/write heads 112 can be used to control the velocity of actuator 118 when read/write heads 112 are flying over the disc surfaces. However, when read/write heads 112 are proximate to load/unload ramp block 130 during head load/unload operations, read/write heads 112 may not generate signals that are suitable for actuator velocity control. Instead, disc drive circuitry 120 can use a BEMF voltage that is fed back from VCM 124 as a load/unload velocity feedback signal.

Disc drive circuitry 120 can include a controller 132 having a VCM driver circuit 134 to provide a drive signal (i.e. drive current) to VCM coil 122 to attempt to move the actuator arm 116. Further, disc drive circuitry 120 may include a sensor 136 coupled to the VCM coil 122 and configured to measure an electrical parameter, such as a BEMF voltage, and to provide a signal corresponding to the measured electrical parameter to controller 132. In an alternative embodiment, the sensor 136 may be part of the actuator 118. In some embodiments, the sensor 136 may be a BEMF sensor.

Controller 132 may further include a processor 138 coupled to VCM driver 134 and to voltage sensor 136. Further, processor 138 may be coupled to a memory 150, which can be configured to store a time threshold 152 and electrical parameter thresholds 158 and 160. Further, the memory 150 can be configured to store calibration instructions 156 that, when executed, cause the processor 138 to calibrate or reset sensor 136, to calibrate values of parameters measured by the sensor 136, such as a resistance of VCM coil 122, or both. Additionally, the memory 150 can store unlatch instructions 162 that, when executed, cause the processor 138 to control the VCM driver 134 to apply a drive current to VCM coil 122, causing VCM coil 122 to apply torque to actuator arm 116 to attempt to move actuator arm 116. Further, unlatch instructions 162 may cause the processor 138 to monitor an electrical parameter associated with the VCM coil 122 and measured by the sensor 136. The measurement of the sensor 136 can allow the processor 138 to detect an unlatch state of the actuator arm 116.

The controller 132 can perform an unlatch operation followed by a load operation to move actuator arm 116 from crash stop 126 or 128. To attempt this, the actuator arm 116 may be unlatched from the crash stop 126 or 128. After the unlatch operation is complete, actuator arm 116 may no longer be in contact with the ramp 130, but the heads 112 may be on the ramp 130. To determine when the unlatch operation is completed, controller 132 can monitor an electrical parameter, such as the BEMF voltage, to detect substantial velocity in the desired direction. During the load operation, controller 132 may control the VCM coil 122 to move the heads 112 off the ramp 130 to establish an air bearing surface (ABS) under accurate BEMF sensing.

As discussed above, the unlatch operation can be further divided into a safe unlatch path and an unsafe unlatch path. In the safe unlatch path, the controller 132 can unlatch the actuator arm 116 within a set of criteria whereby the BEMF sensor (i.e., the BEMF measurement error) is in good condition. In an example of the safe unlatch path, the BEMF exceeds first threshold 158 while an applied drive current ($I_m$) is below a maximum current ($I_{max}$) and while the time period is less than a pre-determined threshold (time threshold 152).

In an embodiment, the processor 138 may perform a first unlatch operation by controlling the VCM driver 134 to apply a current to the VCM coil 122. During the first unlatch operation, the processor 138 can reset and start timer 154, execute calibration instructions 156 to calibrate the sensor 136, control the VCM driver 134 to apply the current to the VCM coil 122, and monitor the electrical parameter measurement using the sensor 136. If the measured electrical parameter exceeds a first threshold 158 within a pre-determined period of time (i.e., before timer 154 exceeds time threshold 152), processor 138 can detect a safe unlatch event where the measurement error (such as a BEMF voltage measurement error) from sensor 136 is sufficiently low that processor 138 can safely and reliably control the VCM driver 134 to transition from load to normal operation. This can be done in response to detecting a safe unlatch event with good assurance on BEMF measurement accuracy.

In another embodiment, when the actuator arm 116 has become stuck to crash stop 126 or 128, processor 138 can control the VCM driver 134 to attempt to unlatch the actuator arm 116 at least once. In particular, during a first unlatch operation, if the measured electrical parameter does not exceed the first threshold 158 within the pre-determined period of time (time threshold 152), the processor 138 can continue to control the VCM coil 122 to attempt to move the actuator arm 116. If the attempt to move the actuator arm 116 succeeds before the electrical parameter exceeds the second threshold 160, the processor 138 detects an unsafe unlatch event. In response to detecting the unsafe unlatch event, the processor 138 may park the actuator arm 116, calibrate the sensor 136 using calibration instructions 156, reset and restart the timer 154, and attempt to perform a second unlatch operation. In such an example, the first unlatch operation may have broke the adhesive bond between the sticky crash stop 126 or 128 and the actuator arm 116. The park operation followed by the second attempt to move the actuator arm may happen within a short enough time period that the adhesive bond is unable to reform or does not form at a level to prevent a safe unlatch event.

If the actuator arm 116 remains stuck when the electrical parameter reaches or exceeds second threshold 160, processor 138 may detect a false unsafe unlatch event. In response to detecting a false unsafe unlatch event, the processor 138 can control the VCM driver 134 to park the actuator arm 116, the reset timer 154, the calibrate sensor 136 using calibration instructions 156, restart the timer 154 and perform another attempt to move the actuator arm 116. The processor 138 may loop through this sequence multiple times, attempting to move the actuator arm 116 two, three, four, or more times, and eventually causing the adhesive bond to break down to allow the actuator arm 116 to unlatch from the crash stop 126 or 128 and eventually to unlatch through a safe unlatch event. After multiple iterations, the controller 132 may abort the load operation if the actuator arm 116 cannot be moved.

The above described technique makes it possible to apply a torque to the actuator arm 116 for an extended period of time to unlatch from a stop area and then to park, calibrate, and re-load the read/write head 112 by attempting to move the actuator arm 116 a second time. Re-parking and re-calibration make it possible to unstick actuator arm 116 from a stopped point without using faulty velocity information due to measurement errors, such as might be caused by heating of VCM coil 122.

In the examples above, an electrical parameter can be monitored to determine whether the actuator arm 116 is unlatched and loaded from a parked position. This electrical parameter can be a current, a voltage, a complex impedance, or another electrical parameter. In a particular embodiment, the electrical parameter can be a BEMF voltage and the sensor 136 can be a BEMF sensor. The velocity of the actuator arm 116 can be derived from the BEMF voltage from a voice coil resistance calibration sequence of the VCM coil 122. One possible configuration from which the BEMF voltage may be extracted from the VCM coil 122 is described below with respect to FIG. 2.

Figure 2:
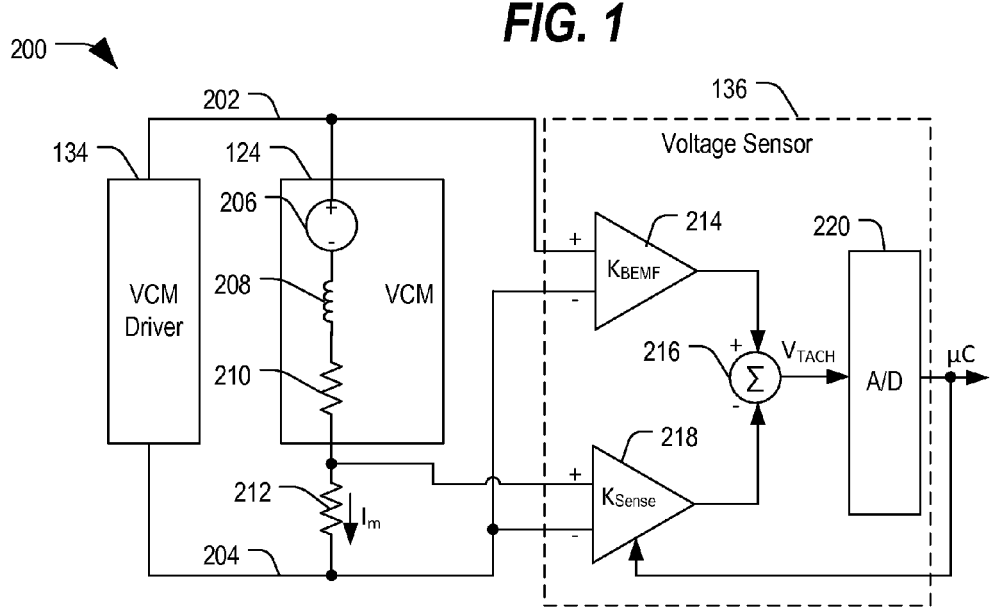
FIG. 2 is a diagram of an illustrative embodiment of a system for actuator arm unlatching.

FIG. 2 is a diagram of a portion 200 of the disc drive system 100 including a voltage sensor 136 that may be configured to determine a digital signal corresponding to a BEMF voltage of the VCM 124. The portion 200 can include a first node 202 and a second node 204 coupled to the VCM driver 134. The VCM 124 may include a BEMF voltage 206 having a first terminal coupled to first node 202 and a second terminal coupled to a first terminal of an inductor 208. Inductor 208 may have a second terminal coupled to a first terminal of a resistor 210, which can have a second terminal and which represents a resistance of VCM coil 122. The portion 200 may include a sense resistor 212 that can have a first terminal coupled to the second terminal of resistor 210 and a second terminal coupled to node 204.

Sensor 136 may be implemented as a voltage sensor and can include a first comparator 214 having a first input coupled to node 202, a second terminal coupled to node 204, and an output coupled to a first input of a summing node 216. The voltage sensor 136 can also include a second comparator 218 having a first input coupled to the first terminal of sense resistor 212, a second input coupled to node 204, and an output coupled to a second input of summing node 216. Summing node 216 may be configured to subtract the signal at the second input from the signal at the first input and to provide a difference signal representing the measured BEMF voltage ($V_{TACH}$) to an input of an analog-to-digital converter 220, which provides a digital output signal (μC) to an output, which may be coupled to the processor 138 shown in FIG. 1. The digital output signal (μC) may also be provided to a control input of comparator 218.

In the illustrated embodiment, the BEMF voltage ($V_{TACH}$) can be determined according to equation 1 below.

$$V_{TACH} = K_{BEMF} * (BEMF + LdI_m/dt + I_m R_{210} + I_m * R_{212}) - K_{Sense} * I_m * R_{212} \quad (1)$$

In Equation 1, the variable $R_{210}$ represents the resistance of VCM coil 122, the variable L represents the inductance (represented by inductor 208) of the VCM coil 122, the BEMF can be the BEMF voltage 206, the variable $I_m$ is the drive current that is driven into VCM coil 122, the variable $K_{BEMF}$ is a gain applied to the differential voltage between nodes 202 and 204, and the variable $K_{SENSE}$ represents the gain applied to the voltage across sense resistor 212. The variable ($V_{TACH}$) represents a measured BEMF voltage corresponding to the BEMF voltage 206.

In an example, gains $K_{BEMF}$ and $K_{Sense}$ can be carefully calibrated and any offsets in the above implementation compensated for such that measured BEMF voltage ($V_{TACH}$) contains a reduced (or minimal) error. The BEMF calibration can be performed with the actuator in a parked position, i.e., in contact with one of the crash stops 126 or 128 and prior to the unlatch operation. When processor 138 begins the unlatch process, as the drive current ($I_m$) increases, any residual calibration error, which is proportional to the drive current ($I_m$) will also increase. Additionally, the increased magnitude of the drive current ($I_m$) that is applied for an extended time to unstick actuator arm 116 can heat VCM coil 122 and cause the resistance ($R_{210}$) to increase. The residual calibration error and increasing resistance may increase the error in the measured BEMF voltage ($V_{TACH}$) as a function of the drive current ($I_m$) magnitude and time. The rate at which the degradation occurs depends on the particular actuator's mechanical and electrical properties, and on the accuracy of the initial calibration. For a drive current ($I_m$) that is increased to a particular current level (such as a maximum level) and is maintained at that level while the error due to the initial calibration error remains constant, the BEMF measurement error attributable to heating of the VCM coil 122 continues to increase with time and eventually dominates the measurement error.

It should be appreciated that, within the VCM coil 122, the BEMF opposes motion. The coil resistance (represented by resistor 210) increases due to heating, and the error due to heating of the VCM coil 122 has the same appearance and sign as the BEMF. Accordingly, heating of the VCM coil 122 can result in excessive error that appears as motion of the actuator arm 116 in the desired direction. In an example, the measurement error in the BEMF poses a problem to the unlatch process. If the measurement error is equal to the target velocity while the actuator arm 116 is still adhering to the crash stop 126 or 128, then the control loop (controller 132) senses no velocity error and the drive current ($I_m$) is no longer increased. As the VCM coil 122 continues to become hotter, the drive current ($I_m$) may even be decreased, and the actuator arm 116 may remain stuck. In this example, the controller 132 may consider the actuator arm 116 moving when it is in fact stopped, i.e., a "stall" condition.

If the measurement error in BEMF is large but not equal to the target velocity, then the controller 132 can move the actuator arm 116 at a speed equal to the target velocity plus the measurement error, which will cause the actuator arm 116 to unlatch successfully, overcoming the stickiness of the crash stop 126 or 128. Once the actuator arm 116 is unlatched, the measurement error of the BEMF may not decrease quickly due to the thermal time constant of the actuator mechanics, leading to a potential sustained measurement error in the measured BEMF voltage as the read/write heads 112 are moved to the disc media from the parked position. Thus, the actuator arm 116 can be moved with a speed error that can interfere with the proper transition to normal operation. For example, read/write heads must be moved off the ramp with accurate speed control to ensure proper air-bearing formation, so a large speed error during unload is undesirable.

In the example shown below with respect to FIGS. 3A and 3B, the stickiness between the actuator arm 116 and the crash stop is low such that a safe unlatch operation occurs during a time period that is less than a predetermined time (less than 200 ms and typically less than about 100 ms).

Figure 3A:
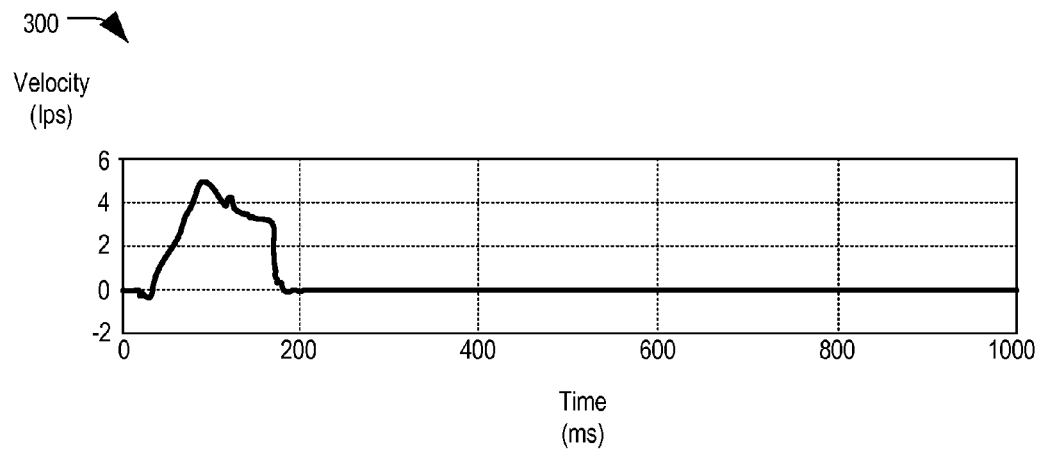
FIG. 3A is a diagram of a loading profile showing velocity versus time for a read/write head being loaded from an outside diameter stop area.

FIG. 3A is a diagram 300 of a ramp loading profile showing velocity in inches per second (Ips) versus time in milliseconds (ms) for a read/write head being loaded from an outside diameter crash stop. In the illustrated example, the BEMF voltage increases from approximately zero volts to a peak level (about 5 Ips) at about 100 ms, then begins to fall off as the actuator arm 116 moves away from the OD crash stop 128 and reaches a target velocity of about 3 Ips. This pattern demonstrates that the velocity (measured as a function of the BEMF voltage) falls off quickly once the actuator arm 116 moves away from the stop area.

Figure 3B:
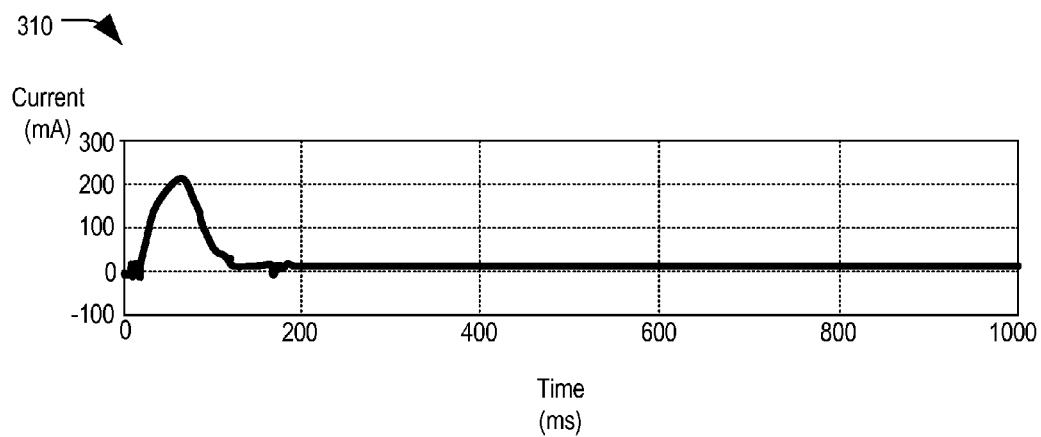
FIG. 3B is a diagram of a loading profile, based on FIG. 3A, showing current versus time.

FIG. 3B is a diagram 310 of the ramp loading profile of FIG. 3A showing current versus time. In the illustrated example, the loading current decreases once the velocity determined from the measured BEMF voltage indicates that the actuator arm 116 has reached a target velocity. In an example, a maximum loading current during a normal (non-sticky) loading process is about 200 mA for a 2-head drive.

In contrast to the normal (non-sticky) OD crash stop 128 ramp loading profiles described in FIGS. 3A and 3B, build up of adhesion between the actuator arm 116 and a crash stop (or stop area) may result in a different velocity and/or current profile. Given a disc drive that has been left undisturbed for a long period of time, the strength of an adhesive bond between the crash stop 126 or 128 and the actuator arm 116 can increase. A representative example of the velocity and drive current profiles for an attempt to move the actuator arm 116 that is stuck to a stop area is described below with respect to FIGS. 4A and 4B.

Figure 4A:
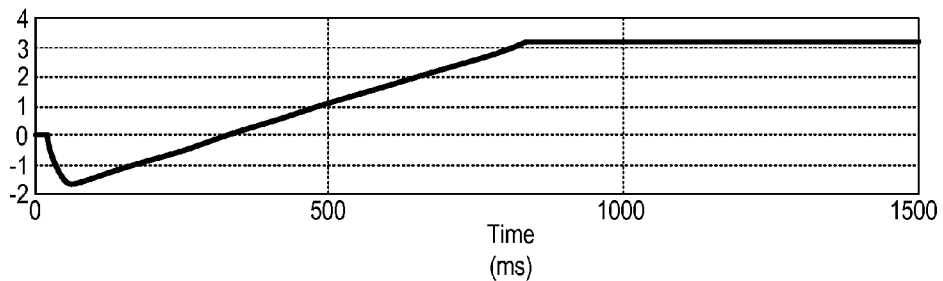
FIG. 4A is a diagram of a loading profile showing velocity versus time for a read/write head that is stuck to the outside diameter stop area during loading.

FIG. 4A is a diagram 400 of a ramp loading profile showing velocity versus time for a read/write head that is stuck to the outside diameter crash stop during loading. When the drive current is first applied, the velocity in ips initially decreases from zero to a negative value. This false negative velocity is caused by the dynamics of the VCM coil inductance transient due to a dramatic current increase at the beginning of loading. The velocity (Ips) gradually increases as the measurement error associated with the BEMF voltage increases until the velocity determined from the BEMF reaches about 3 ips at approximately 700 ms. At this stage, the measurement error equals or exceeds the target velocity. While the head velocity appears to be increasing, the read/write head is actually stationary. In this example, the increase in the BEMF voltage is caused by the coil resistance increase due to temperature. When the large constant drive current is driven into the VCM coil, the temperature of the coil rises, producing a change in the resistance and in the corresponding BEMF measurement.

Figure 4B:
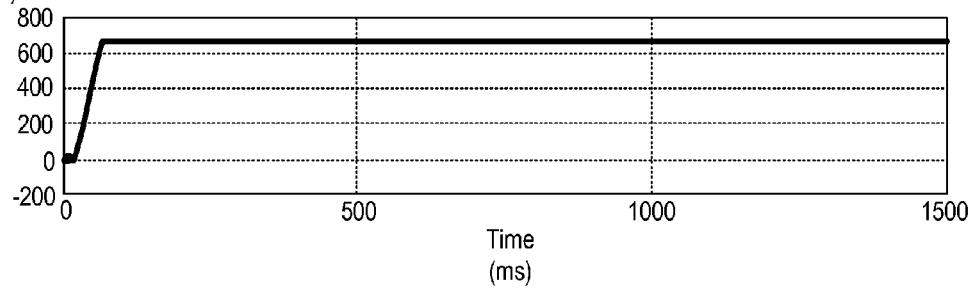
FIG. 4B is a diagram of the ramp loading profile of FIG. 4A showing current versus time.

FIG. 4B is a diagram 410 of the ramp loading profile of FIG. 4A showing current versus time. In the illustrated example, the drive current or loading current increases to saturation at about 650 mA and does not drop until the loading process times out. Though the current is saturated, the BEMF velocity of FIG. 4A provides a spurious indication of head velocity.

Thus, the BEMF voltage level and the drive current can increase to a peak level within 200 ms for a normal (non-sticky) crash stop. In contrast, a sticky crash stop may result in a relatively slowly increasing BEMF voltage that takes almost 700 ms to exceed the target velocity and a corresponding drive current that reaches saturation and then does not change. The voltage and current profiles depicted in FIGS. 4A and 4B can be used to detect an unsafe unlatch event.

As discussed above, given an actuator arm that has been left undisturbed for a relatively long period of time, the strength of an adhesive bond between the crash stop 126 or 128 and the actuator arm 116 can increase. However, once the actuator arm 116 successfully breaks free from the adhesive bond, and subsequently is parked again against the crash stop 126 or 128, the adhesive bond will likely need another long period of contact time before it can build up the same level of stickiness. In other words, if a second unlatch is attempted within a short period of time from a first successful unlatch, the second unlatch attempt may need to overcome a lower level of stickiness (i.e. adhesion).

Further, the application of current to the VCM coil 122 applies a torque to the actuator arm 116. To unlatch the actuator arm 116 from a crash stop 126 or 128, the force may be applied for a sufficient period of time. Attempting to reduce the applied time by increasing the amount of force applied may require the amount of force to be increased in an exponential manner. If the disc drive has a limit on how much current can be used to drive the VCM coil 122, which limit may be set by the supply voltage, it is probably not possible to circumvent coil heating by reducing the applied time by increasing the magnitude of the applied coil current. However, the controller 132 can allow for sustained application of the voice coil current for an extended period of time to overcome the stickiness of the crash stop.

When the drive current ($I_m$) has been applied for a period of time that exceeds the time threshold 152 and yet the actuator arm 116 has not unlatched from the crash stop, the controller 132 may detect an unsafe unlatch path or event. In response to detecting the unsafe unlatch path, the controller 132 can apply the drive current while the measurement from the BEMF sensor 136 continues to degrade. In this way, drive current ($I_m$) may be applied for an extended time period to overcome crash stop stickiness. Eventually due to such application of torque, the controller 132 may unlatch actuator arm 116; however, the measurement accuracy of BEMF sensor 136 may be severely degraded. Degradation of the measurement accuracy can render transitioning to the load operation unsafe.

Accordingly, the controller 132 can detect an unsafe unlatch operation and enter a return path where the actuator arm 116 is returned to a parked position in contact with the crash stop. Once parked, the controller 132 can calibrate the sensor 136 in order to recalibrate the BEMF measurement. Once the back EMF sensor has been recalibrated, the controller 132 can attempt a second unlatch operation.

The controller 132 can be configured with a time threshold that is large enough to allow for loading of the read/write heads from a normal or slightly sticky crash stop while still detecting when the unload process has exceeded a time window that might result in excessive BEMF measurement error. By utilizing information about the adhesive property of the stickiness between actuator arm 116 and crash stop 128, controller 132 may perform a load operation two or more times (calibrating before each attempt) in order to load the read/write head from a crash stop, safely and reliably.

One characteristic of the adhesive property is that the adhesion or stickiness increases over time. A representative example of the relationship between the stickiness and the length of time is described below with respect to FIGS. 5A and 5B.

Figure 5A:
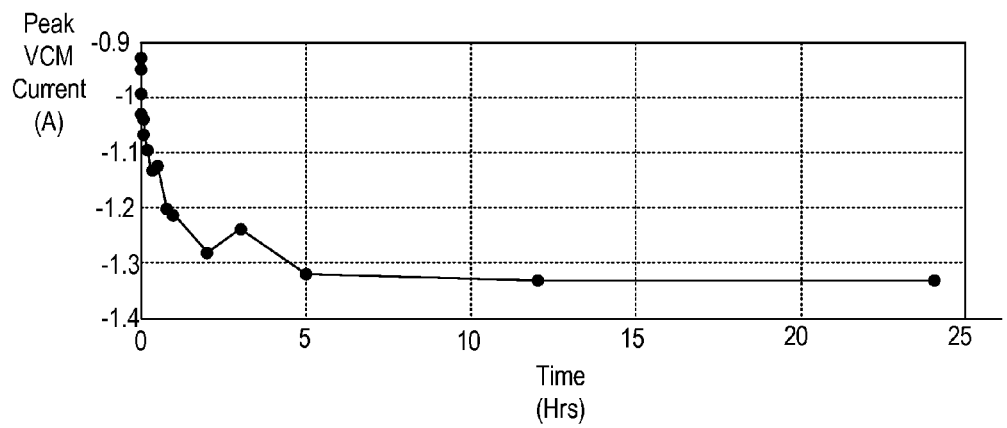
FIG. 5A is a diagram of unlatch current versus time for unsticking an actuator arm from a stop area.

FIG. 5A is a diagram 500 of unlatch current versus time for unsticking an actuator arm from a crash stop. For actuator arms that are parked for short periods of time, such as periods less than half an hour, adhesion between the actuator arm 116 and the crash stop 128 may be low, allowing for unlatching using approximately 0.2 A. However, as the amount of time increases, drive current (or VCM current) used to unlatch the read/write head may increase to about 400 mA, such as after the actuator arm 116 is parked for a few hours.

Figure 5B:
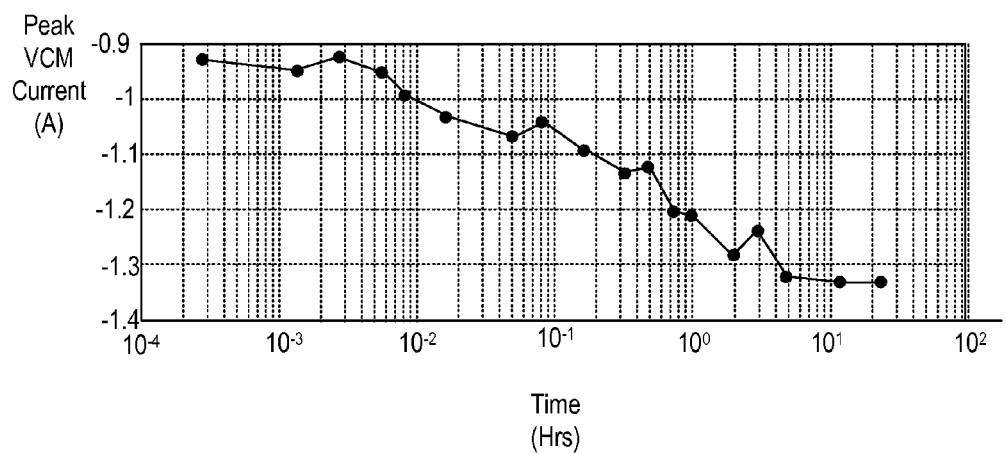
FIG. 5B is second version of the diagram of FIG. 5A with an extended time scale.

FIG. 5B is second version 510 of the diagram 500 of FIG. 5A with an extended time scale. This second version 510 shows that the load current used to move the actuator arm 116 from a parked position after parking for a short duration is much less than that needed to move the actuator arm 116 after a few hours. The additional drive current used to move the actuator arm 116 demonstrates that the adhesive bonds can build up over time.

Given this property of the stickiness of a crash stop, by attempting to unlatch actuator arm 116 twice, because the first unlatch operation achieves separation of actuator arm 116 from the crash stop 126 or 128, the second unlatch attempt can occur with a lower stickiness on the crash stop 126 or 128, making it possible to unlatch the actuator arm 116 in a safe unlatch condition. Thus, the dual unlatch makes it possible to unlatch the actuator arm 116 using a degraded BEMF sensor while ensuring the read/write heads 112 are properly loaded by parking actuator arm 116, recalibrating the BEMF sensor, and attempting unlatching actuator arm 116 a second time.

The technique described above works even if the BEMF sensor degradation is extensive enough to cause unlatch detection failure, such as a false unsafe unlatch condition. Since BEMF degradation is largely caused by the increase in resistance of the VCM coil 122, the measurement error in the BEMF voltage can cause the BEMF sensor to degrade to a point where false unlatch detection occurs, such as when the measurement error associated with the measured BEMF voltage exceeds second threshold 160. However, in response to an unsafe unlatch event or a false unsafe unlatch event, the controller 132 will reset and re-attempt to unlatch actuator arm 116 until a safe unlatch is achieved or a pre-determined number of retries is exceeded.

Figure 6:
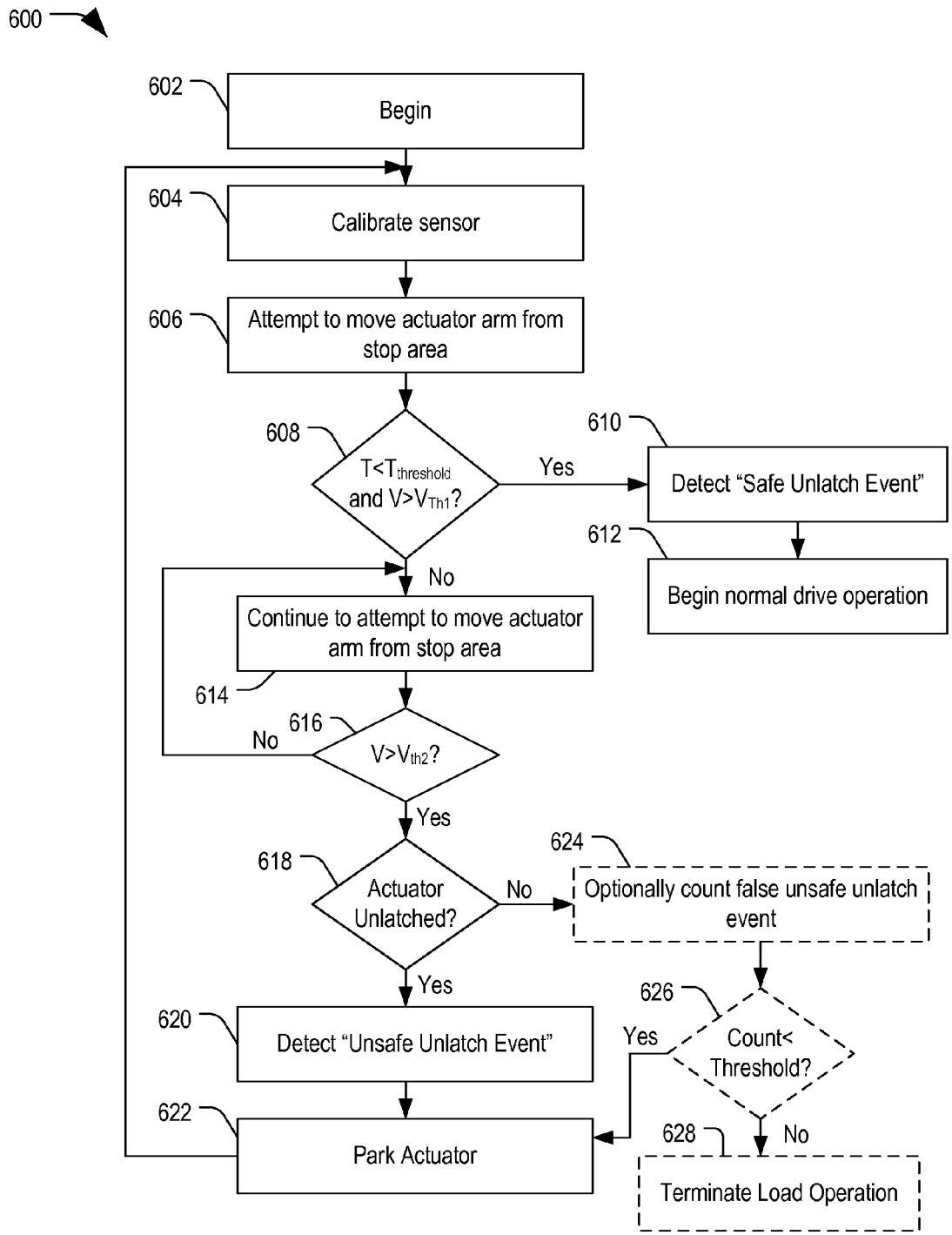
FIG. 6 is a flow diagram of an embodiment of a method of moving an actuator arm from a stopped position.

FIG. 6 is a flow diagram of an embodiment of a method 600 of unsticking an actuator arm from a stop. In some embodiments, a sensor may be a BEMF sensor, the electrical parameter may be a BEMF voltage, and first and second thresholds can be voltage thresholds ($V_{Th1}$ and $V_{Th2}$). At 602, the unlatch process begins. Advancing to 604, a controller may calibrate the sensor. Continuing to 606, the controller can attempt to move the actuator arm (such as actuator arm 116) away from a stop area (such as a crash stop 126 or 128). For example, the controller 132 can attempt to move the actuator arm 116 by controlling the VCM driver 134 to apply a drive current to the VCM coil 122 and by monitoring an electrical parameter of the VCM 124, such as a BEMF voltage.

Proceeding to 608, if a time during which the controller is attempting to move the actuator arm is less than a time threshold and a BEMF voltage is greater than $V_{Th1}$, the method 600 may move to 610 and the controller may detect a safe unlatch event. Method 600 can then continue to 612 and the controller may begin (transitions) to normal drive operation.

At 608, if the time exceeds the time threshold before the BEMF voltage exceeds the threshold, method 600 can advance to 614 and the controller may continue to attempt to move the actuator arm from the stop area. Moving to 616, if the BEMF voltage does not exceed $V_{Th2}$, method 600 can return to 612 and the controller may continue to attempt to move the actuator arm from the stop area. At 616, if the BEMF voltage exceeds $V_{Th2}$, the method 600 can advance to 618 and the controller may determine if the actuator arm was unlatched. If the actuator arm unlatched, method 600 can advance to 620 and the controller may detect an unsafe unlatch event. Continuing to 622, the controller may park the actuator arm and method 600 can return to 604 where the controller can recalibrate the sensor.

At 618, if the actuator failed to unlatch, method 600 may advance to 624 and the controller can count the actuator unlatch failure event. In an example, the controller can detect a false unlatch event and maintain a count of such failed attempts. Continuing to 626, if the count is less than a count threshold, method 600 can continue to 622 and the controller may park the actuator arm and then retry the unlatch process. However, at 624, if the count equals or exceeds the count threshold, the method 600 can advance to 628 and the controller may terminate the read/write head load operation.

Method 600 is an example of a possible method for unlatching from a stopped state that involves repeatedly attempting to move a load (e.g. an actuator arm) from a stop position or stop area through recalibrating and re-attempting to move the load. Moreover, although method 600 illustrates embodiments and is described herein, it should be appreciated that any subsequent arrangement designed to achieve the same or similar purpose may be substituted for the specific elements of the method.

It is to be understood that, even though characteristics and advantages of the various embodiments have been set forth above, together with details of the structure and function of various embodiments, changes may be made in details, especially in the matters of structure and arrangement of parts within principles of the present disclosure to the full extent indicated by the broad meaning of the terms in which the appended claims are expressed. For example, while the description of disc drive system 100 includes sensor 136 within disc drive circuitry 120, sensor 136 may be part of VCM 124. Further, VCM driver 134 may be external to controller 132. Further, the particular components or elements may vary depending on the particular application for the system while maintaining substantially the same functionality without departing from the scope and spirit of the disclosure. In addition, while the above-discussion focused on usage of the BEMF voltage measurement of a disc drive VCM, it will be appreciated by those skilled in the art that the teachings disclosed herein can be carried out using measurements of other electrical parameters and/or can be applied to other dynamic systems in which controlled movement of an element may encounter an adhesive bond after a period of time in which the element is not moving.

In accordance with various embodiments, the methods described herein may be implemented as one or more software programs running on a computer processor or controller, such as the controller 132. Dedicated hardware implementations including, but not limited to, application specific integrated circuits, programmable logic arrays, and other hardware devices can likewise be constructed to implement the methods described herein. Further, the methods described herein may be implemented as a computer readable storage medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   attempting to unlatch an actuator arm from a stop;
   measuring an electrical parameter of a driver circuit of the actuator arm;
   detecting an unsafe unlatch event using a controller when the electrical parameter does not exceed a first threshold within a predetermined period of time;
   continuing to attempt to unlatch the actuator arm until the electrical parameter exceeds a second threshold in response to detecting the unsafe unlatch event;
   parking the actuator arm against the stop; and
   performing a second attempt to unlatch the actuator arm.

2. The method of claim 1, further comprising the electrical parameter is a back electromotive force (BEMF).

3. The method of claim 1, further comprising a voice coil motor responsive to the driver circuit.

4. The method of claim 1, further comprising, before performing the second attempt, calibrating a sensor that is coupled to a motor that is responsive to the driver circuit.

5. The method of claim 1, further comprising detecting a false unsafe unlatch event when a measurement error associated with the electrical parameter exceeds the second threshold and a current level of a current supplied by the driver circuit is at a current limit.

6. The method of claim 1, further comprising:
   detecting a safe unlatch event when the electrical parameter exceeds the first threshold within the predetermined period of time; and
   transitioning to a normal operating mode in response to detecting the safe unlatch event.

7. The method of claim 1, further comprising, prior to attempting to unlatch the actuator arm, selecting the first threshold to be greater than a level of the electrical parameter at which the actuator arm can be latched and not moving.

8. The method of claim 1, further comprising, before attempting to unlatch the actuator arm, calibrating a resistance of a motor to calibrate a sensor.

9. An apparatus comprising:
   an actuator arm that is configured to park at a stop area; and
   a controller coupled to a motor configured to drive the actuator arm, the controller configured to:
   determine an electrical parameter of the motor;
   apply a current to the motor to attempt to unlatch the actuator arm from the stop area;
   detect an error event when the electrical parameter is less than a first threshold after a period of time; and
   continue to apply the current after the period of time until a measurement error exceeds a second threshold.

10. The apparatus of claim 9, wherein the actuator arm is configured to park at the stop area during an idle period, the apparatus further comprising a sensor, wherein the controller is configured to park the actuator arm at the stop area, calibrate the sensor, and apply the current to the motor to attempt to unlatch the actuator arm.

11. The apparatus of claim 10, further comprising the controller configured to apply the current, park the actuator arm at the stop area, calibrate the sensor, reset a timer, and apply the current iteratively until the actuator arm is unlatched within the period of time.

12. The apparatus of claim 9, further comprising the controller configured to detect a false unsafe unlatch event when the measurement error exceeds the second threshold and the actuator arm remains parked.

13. The apparatus of claim 9, further comprising the controller configured to detect a safe unlatch event when the electrical parameter exceeds the first threshold within the period of time and to transition to normal operation in response to detecting the safe unlatch event.

14. An apparatus comprising:
   a controller coupled to a motor and configured to control the motor to attempt to move a movable element, the controller further configured to:
   detect a safe event when an electrical parameter of the motor exceeds a first threshold within a predetermined period; and
   detect an unsafe event when the electrical parameter does not exceed the first threshold within the predetermined period, the predetermined period including a time period within which a measurement error associated with the electrical parameter is sufficiently low to allow transition to normal operation.

15. The apparatus of claim 14, further comprising:
   the motor configured to drive a load; and
   the electrical parameter is a back electromotive force.

16. The apparatus of claim 15, further comprising the load is an actuator arm of a disc drive.

17. The apparatus of claim 14, further comprising the controller configured to detect a false unsafe event when a measurement error exceeds a second threshold.

18. The apparatus of claim 14, further comprising:
   the electrical parameter is a back electromotive force (BEMF); and
   the first threshold selected to be greater than a voltage level of the BEMF at which a load on the motor can be latched and not moving.

19. The apparatus of claim 14, further comprising:
   the motor is a voice coil motor (VCM) configured to attempt to unlatch an actuator arm from a stop area; and
   in response to detecting the unsafe event, the controller is configured to:
   continue to attempt to unlatch the actuator arm until a measurement error exceeds a second threshold;
   park the actuator arm at the crash area;
   calibrate a sensor to measure the electrical parameter;
   reset a timer;
      attempt again to unlatch the actuator arm; and
   repeat iteratively performance of continuing, parking, calibrating, resetting, and
      attempting until the controller detects the safe event.

* * * * *